(12) United States Patent
Cartledge et al.

(10) Patent No.: US 8,275,692 B2
(45) Date of Patent: Sep. 25, 2012

(54) SYSTEM AND METHOD FOR AUTOMATIC TRADING OF FOREIGN EXCHANGE CURRENCIES

(75) Inventors: Timothy Michael Cartledge, Bishops Stortford (GB); David Laurence Cooney, Woldingham (GB)

(73) Assignee: Barclays Bank PLC (GB)

( * ) Notice: Subject to any disclaimer, the term of this patent is extended or adjusted under 35 U.S.C. 154(b) by 969 days.

(21) Appl. No.: 12/039,420

(22) Filed: Feb. 28, 2008

(65) Prior Publication Data
US 2008/0270285 A1 Oct. 30, 2008

Related U.S. Application Data

(60) Provisional application No. 60/926,693, filed on Apr. 27, 2007.

(51) Int. Cl.
*G06Q 40/00* (2006.01)

(52) U.S. Cl. .......................................... 705/37; 705/38
(58) Field of Classification Search ............... 705/35–39
See application file for complete search history.

(56) References Cited

U.S. PATENT DOCUMENTS

| | | | |
|---|---|---|---|
| 6,952,683 B1 * | 10/2005 | Gerhard | 705/37 |
| 7,996,301 B2 * | 8/2011 | Callaway et al. | 705/37 |
| 2005/0283422 A1 * | 12/2005 | Myr | 705/37 |

* cited by examiner

*Primary Examiner* — Thu Thao Havan
(74) *Attorney, Agent, or Firm* — Amster, Rothstein & Ebenstein LLP

(57) ABSTRACT

A method for automatic trading of foreign exchange currencies including the steps of: receiving first signals at an order receiver based on one or more orders for foreign exchange currency trades; sending second signals from an order configuration tool that provides for selection of a preferred execution method for each of the foreign exchange trades using an algorithm; and executing each of the foreign exchange trades based on received third signals relating to a respective determined preferred execution method.

37 Claims, 5 Drawing Sheets

| Time (GMT) | Operator | Event | Notes |
|---|---|---|---|
| Apr 10 2007 16:39:00 | Toby | Order Input | |
| Apr 10 2007 16:39:13 | SYSTEM | Clip Generated | 00PNW0005F: BUY EUR/USD 2,900,000.00 20070412 @ 1.34371 |
| Apr 10 2007 16:40:00 | Toby | Order Amended | Order status (old: Live, new: Dormant). |
| Apr 10 2007 16:44:00 | Toby | Order Amended | Order status (old: Dormant, new: Live). |
| Apr 10 2007 16:44:09 | SYSTEM | Clip Generated | 00PNW0005N: BUY EUR/USD 2,900,000.00 20070412 @ 1.34368 |
| Apr 10 2007 16:46:00 | Toby | Order Amended | Order status (old: Live, new: Dormant). |
| Apr 10 2007 16:46:28 | SYSTEM | Order Amended | Order status (old: Dormant, new: Live). |
| Apr 10 2007 16:46:00 | Toby | Order Cancelled | 00PNW0005R: BUY EUR/USD 2,900,000.00 20070412 @ 1.34368 |
| Apr 10 2007 16:46:00 | Toby | Order Cancelled | Cancelled by client. |
| Apr 10 2007 16:46:35 | SYSTEM | Aggregate Created | Auto-aggregate of powerfill order clips |

SYSTEM AND METHOD FOR AUTOMATIC TRADING OF FOREIGN EXCHANGE CURRENCIES

RELATED APPLICATIONS

This application claims priority to U.S. provisional patent application Ser. No. 60/926,693, filed Apr. 27, 2007.

FIELD OF THE INVENTION

The present invention relates generally to a system and method for automatically trading foreign exchange currencies. The present invention further generally relates to a system and method for automatically trading foreign exchange currencies which allows a user to enter orders with varying parameters which will allow users to configure the intended sale price and intended margin for the transaction. The present invention also generally relates to a system and method for automatically trading foreign exchanges currencies which can monitor and act upon information regarding users selling behavior to limit the risk of the system operator.

BACKGROUND OF THE INVENTION

Automated systems for trading foreign exchange currencies are known. For example, Applicant has a system called BARX which is described and available at www.BARX.com.

SUMMARY OF THE INVENTION

A method for automatic trading of foreign exchange currencies according to an exemplary embodiment of the present invention comprises the steps of: receiving first signals at an order processor, the first signals related to one or more parameters related to orders for one or more foreign exchange currency trades; generating second signals at the order processor, the second signals related to configuration of each of the one or more trades; and generating third signals at the order processor, the third signals including instructions for automatically executing each of the one or more trades based on the first signals and the second signals in two or more clips.

A computer readable medium according to an exemplary embodiment of the present invention has computer executable instructions for performing a method for automatic trading of foreign exchange currencies, and the method comprises the steps of: receiving first signals at an order processor, the first signals related to one or more parameters related to orders for one or more foreign exchange currency trades; generating second signals at the order processor, the second signals related to configuration of each of the one or more trades; generating third signals at the order processor, the third signals including instructions for executing each of the one or more trades based on the first signals and the second signals in two or more clips.

In at least one embodiment, each of the one or more parameters is selected from the group of parameters consisting of: currency for target position, counter currency, value date, quote size, spot limit, target position, and execution style.

In at least one embodiment, at least one of the one or more parameters is execution style, and the execution style is selected from the group of execution styles consisting of: limit, volume weighted average price, and time weighted average price.

In at least one embodiment, the execution style is further defined by at least one execution style information element selected from the group of execution style information elements consisting of: user-input name for the execution style, spread factor, time interval between clips, and clip size.

In at least one embodiment, the one or more parameters are selected from a list of one or more pre-defined parameters.

In at least one embodiment, the at least one execution style information element is clip size, and the clip size is fixed.

In at least one embodiment, the at least one execution style information element is clip size, and the clip size is varying.

In at least one embodiment, the at least one execution style information element is clip interval, and the clip interval is fixed.

In at least one embodiment, the at least one execution style information element is clip interval, and the clip interval is varying.

In at least one embodiment, the method further comprises keeping the one or more orders anonymous until the one or more trades are executed.

In at least one embodiment, the method further comprises providing a visual indicator of spread size.

In at least one embodiment, the method further comprises providing a security feature that prevents trade execution within an illiquid foreign exchange market.

In at least one embodiment, the step of providing a security feature comprises generating an alert when a plurality of orders for an identical foreign exchange trade is received.

A system for automatic trading of foreign exchange currencies according to an exemplary embodiment of the present invention comprises: an order receiver that receives one or more parameters related to orders for one or more foreign exchange currency trades; an order configuration tool that allows users to configure each of the one or more trades based on a selected configuration; and an order executor that generates instructions for executing each of the one or more trades in two or more clips in accordance with the selected configuration.

In at least one embodiment, the system further comprises a graphical user interface comprising a visual indicator of spread size.

In at least one embodiment, the system further comprises a security feature that prevents trade execution within an illiquid foreign exchange market.

BRIEF DESCRIPTION OF THE DRAWINGS

Various exemplary embodiments of this invention will be described in detail, with reference to the following figures, wherein:

FIGS. 2A-2G show various screens of a graphic user interface useable with the system shown in FIG. 1.

DETAILED DESCRIPTION OF PREFERRED EMBODIMENTS

Various exemplary embodiments of the present invention are related to a system and method for automatically trading foreign exchange currencies. The present invention further generally relates to a system and method for automatically trading foreign exchange currencies which allows a user to enter orders with varying parameters and that configures the sale price and margin for the transaction in accordance with a selected trade configuration. The present invention also generally relates to a system and method for automatically trading foreign exchanges currencies which can monitor and act upon information regarding users selling behavior to limit the risk of the system operator.

In one embodiment of the invention, a system and method of automatically trading foreign exchange currencies is provided where the user can enter certain information regarding the desired transaction, and the placement of the order will remain anonymous until executed in an automatic fashion by the trading system. This feature of the present invention allows a user of the system to determine a preferred trading strategy in which to execute large orders of transactions in foreign currency exchanges.

In another embodiment, the system executes an order at the most favorable price available within the parameters set by the client. In this fashion, the system can potentially obtain a better deal than the client requested. As another potential embodiment of the present invention, when a better deal to purchase foreign currency than was requested is obtained, the system can offer to purchase additional foreign currency based on the remaining amount of money that the client was originally willing to spend. Thus, in essence, the system according to an exemplary embodiment of the present invention is able to execute the trades in a style selected by the client.

Figure 1:
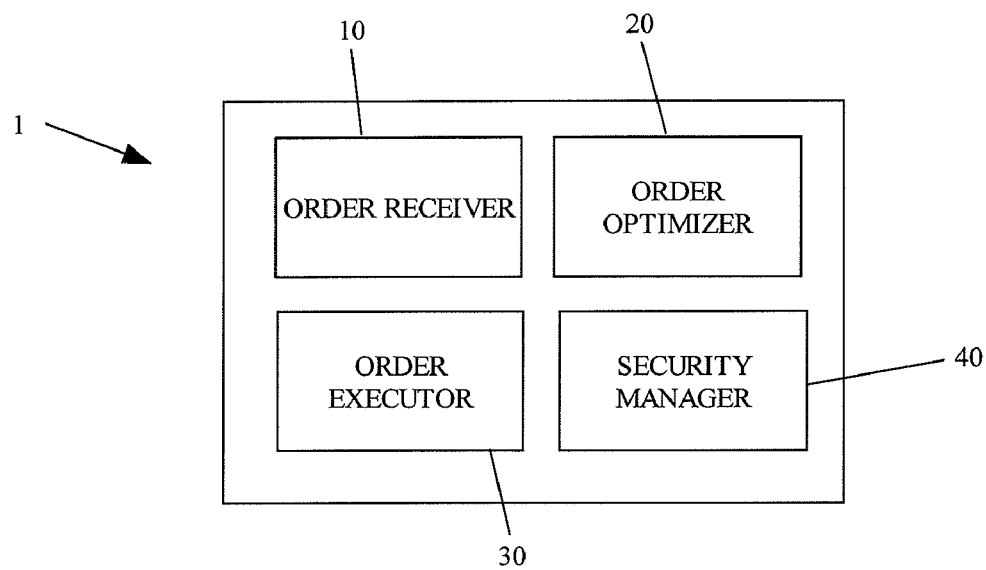
FIG. 1 is a block diagram of a system for automatically trading foreign exchange currencies according to an exemplary embodiment of the present invention.

FIG. 1 is a block diagram of a system, generally designated by reference number 1, for automatically trading foreign exchange currencies according to an exemplary embodiment of the present invention. The various components of the system 1 may be software components ran on a computer processor, separate hardware components, or a combination of software and hardware components.

The system 1 includes an order receiver 10, an order configuration tool 20 and an order executor 30. The order receiver 10 receives one or more orders for foreign currency trades on a foreign exchange market from clients operating on the system 1. As explained in further detail below, the order receiver 10 may include a graphical user interface (GUI) for input of an order, where the GUI requires input of order parameters to complete the order. The GUI may be located internal to the system 1, or at a remote location at a client site, such as at a client computer.

Among other parameters, the order receiver 10 may require input of a preferred trade execution style. A trade execution style defines the way in which a trade is carried out. Examples of execution styles include limit execution style, volume weighted average price ("VWAP") execution style, and time weighted average price ("TWAP") execution style. Each of these execution styles are discussed below.

1) Limit: The execution of a limit order may be triggered when the market reaches a set level. Limit execution may require the client to identify the total amount of foreign currencies which is desired to be purchased, and the clip size. The clip size refers to dividing the order up into clips, or pieces, so that clip size is the amount of funds being traded in each clip. For example, if the client sets the limit at 100 million Euros and the clip size at 10 million Euros, the customer would be requesting 10 transactions of 10 million Euros each. The system can also provide default clip sizes, such as a small clip size of, for example, $5 million, or large clip size of, for example, $20 million. These examples of clip sizes are merely exemplary, any other clip sizes may be used. In addition, the clip size may be variable.

2) Volume Weighted Average Price (VWAP):VWAP is the ratio of the value traded to total volume traded over a particular time horizon, and is a measure of the average price a stock traded at over the trading horizon. In this execution style, VWAP is used as a trading benchmark to keep the trade inline with volume on the market. This execution style may require input of information such as, for example, the desired amount of a particular foreign currency to be purchased (i.e., the target position), the minimum price at which to sell or the maximum price at which to purchase the foreign currency (i.e., the spot limit), whether there is no limit to the order, the speed at which the clips are to be processed (e.g., every 30 seconds, every 2 minutes, one a day, etc.

3) Time Weighted Average Price (TWAP): TWAP is the average price of contracts or shares over a specified time. In this execution style, TWAP is used to keep the price close to that which reflects the true market price. This execution style may require input of information such as, for example, target position; spot limit; spread factor (e.g., 1 pips, or decimal places (dps), and the speed at which the clips are to be processed.

The order configuration tool 20 may use the information regarding the order input by the client to determine the preferred method to carry out the order. For example, the order may be configured so as to obtain the highest buying price or the lowest purchase price. As a further example, the order configuration tool 20 may automatically fill an order at a better price than that requested by the client, or request the client to authorize the order fill after determining that the better price is available. The order configuration tool 20 may also vary clip size and timing between clips to configure the order. Thus, in various exemplary embodiments of the invention, the order configuration tool 20 may fill an order after allowing a client to select a preferred order configuration from a list of preferred configurations. In other exemplary embodiments, the order configuration tool 20 may automatically optimize an order based on information received by the order receiver 10. For the avoidance of doubt, the term "automatically optimize" means a user of the system is permitted to optimize its orders in accordance with its own investment strategy.

The order executor 30 carries out the order for a foreign exchange currency trade as optimized by the order optimizer 20. In this regard, the order executor may carry out the necessary clipping of the order to achieve the optimized results.

Figure 2A:
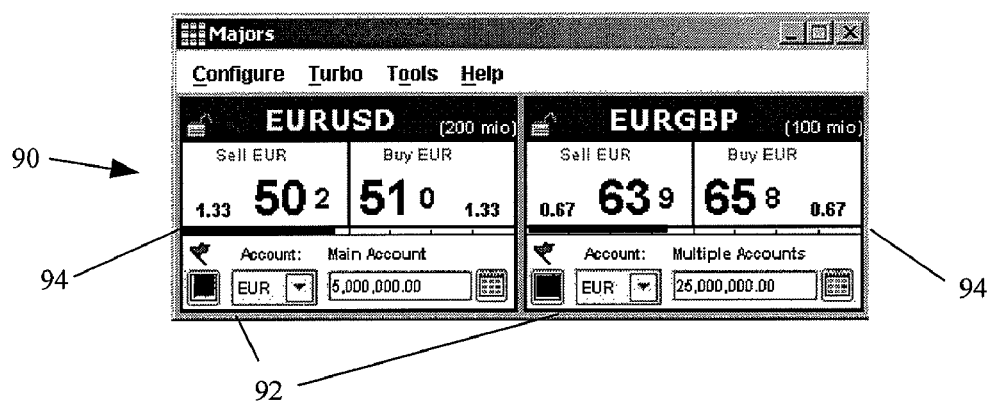

FIGS. 2A-2G shows various screens of a GUI useable with the system 10 according to an exemplary embodiment of the present invention. FIG. 2A shows a market display screen 90 according to an exemplary embodiment of the present invention. The market display screen 90 displays one or more markets 92, and additional information useful to the client trading in a particular market, such as, for example, how much the client has on account within the market. The market display screen 90 may also include a liquidity indicator 94 that indicates the spread size within the market. Although the liquidity indicator 94 is shown as a moving bar in FIG. 2A, it should be appreciated that the liquidity indicator 94 may be any other suitable visual indicator, such as, for example, a dial.

Figures 2B, 2C:
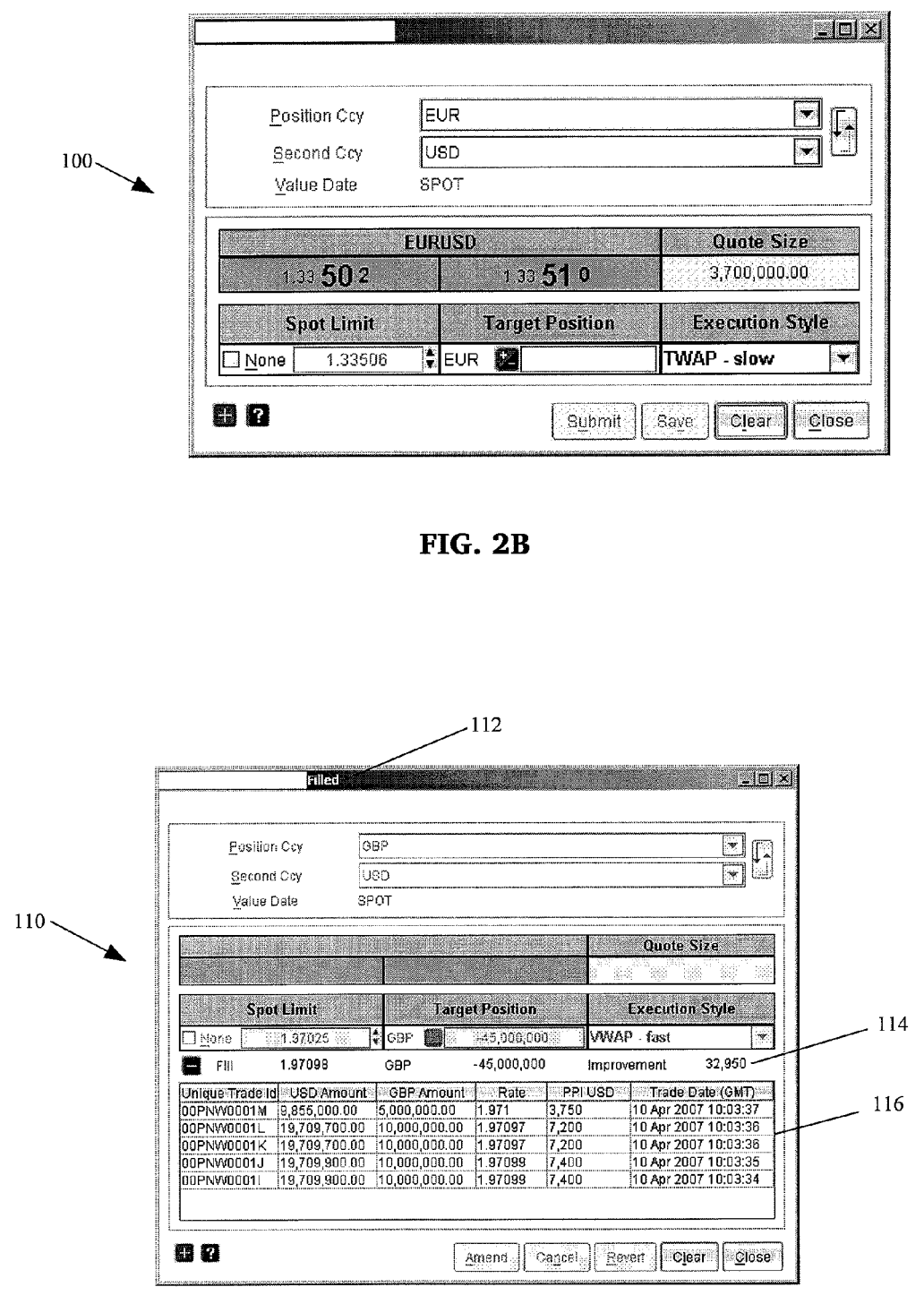

FIG. 2B shows an order fill screen 100 according to an exemplary embodiment of the present invention. The order fill screen 100 allows a client to input information regarding an order for a foreign currency trade on a foreign exchange market. The order fill screen 100 may be accessed from the market as displayed on the system GUI by, for example, clicking on an icon located within the market display. As shown in FIG. 2B, the order fill screen 100 may require input of order parameters, such as, for example, "Position Currency" (i.e., the currency for the target position), "Second Currency" (i.e., counter currency), "Value Date" (i.e., which may be defaulted to spot or rolled to future value dates), "Quote Size" (i.e., clip size), "Spot Limit" (i.e., the limit beyond which an order will be filled), "Target Position" (i.e., the target position in which to fill) and "Execution Style" (which dictates the rules for filling the order). In this regard, the order fill screen 100 may include pull-down menus that allow clients to choose from a limited selection of parameters.

FIG. 2C shows an order status screen 110 according to an exemplary embodiment of the present invention. The order status screen 110 may include an order status display 112 that indicates the order state. For example, the order may be in one of the following states: 1) "Live", meaning that the order will fill according to the current market rate and execution style selected, 2) "Filled", meaning that the sum of the clips equals the target position, 3) "Dormant", meaning that the order was saved on input, rather than submitted, or was suspended after being active, and 4) "Cancelled", which means that the order will no longer generate any clips.

The order status screen 110 may also include an order summary row 114, which displays the average fill rate, fill total to date and improvement. The improvement is the benefit to the client of filling at a better rate than the level requested. In addition, the order status screen 110 may include a clip window 116, which shows details of each individual clip.

Figure 2D:
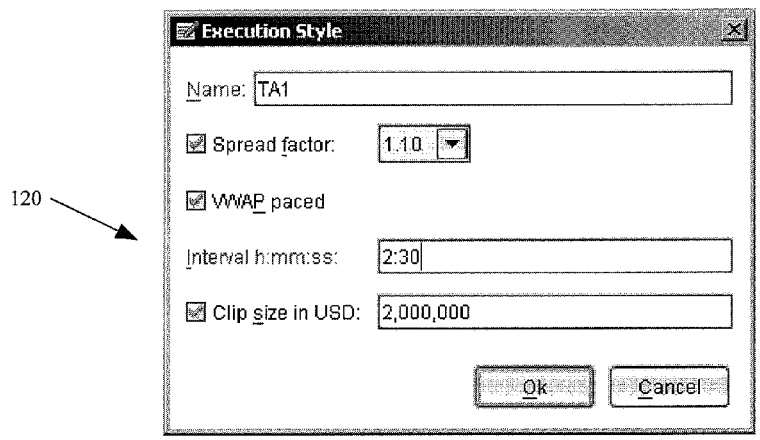

FIG. 2D shows an execution style information element screen 120 according to an exemplary embodiment of the present invention. The execution style information element screen 120 requires a client to input information regarding the selected execution style. For example, the execution style information element screen 120 may include a "Name" field, (requiring input of a client defined execution style reference name), a "Spread Factor" field (requiring input of a factor which limits clip execution to periods where a client spread is within the specified factor of their standard spread). a "VWAP Paced" field (which if checked indicates that filling of the order will be delayed if the volume of the order is affecting the price, an "Interval" field (which requires input of a minimum interval between clips in order to build a position without unduly influencing the market), and a "Clip Size" field (which requires an input of the preferred size of clips used to fill the order).

Figure 2E:
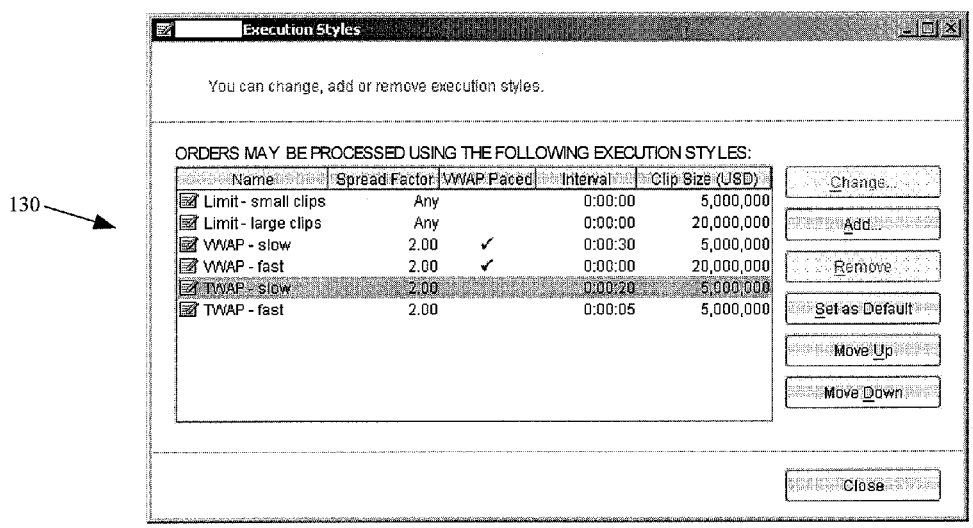

The execution style information element screen 120 allows clients to define their own execution style. However, the system 1 preferably provides a list of default execution styles from which the client may choose for the order. In this regard, the GUI of the system 1 may include an execution style screen 130, as shown in FIG. 2E. The default styles illustrate different capabilities available to the users. "Limit-small clips'" and "'Limit-large clips" break down large deals into smaller clips with no limiting spread factors, VWAP settings or time intervals. There are two VWAP settings which limit trading to avoid affects on the market volume and which use a spread factor of 2. In addition, "VWAP-slow" has a time interval of 30 seconds between clips and a clip size of USD 5 million, while "VWAP-fast'" has no time interval and a clip size of USD 20 million. Finally, there are 2 TWAP settings ("TWAP-slow" and "TWAP-fast") which have different intervals to pace execution without any VWAP restrictions. It should be appreciated that these default terms may be varied, and the default terms defined herein are merely exemplary. Selection of any one of these default execution styles may result in pre-population of the execution style information element screen 120.

The order executor 30 may also have the ability to generate an audit trail while executing the order. In this regard, as shown in FIG. 2F, the GUI of the system 1 may include an audit trail screen 140 that displays the audit information generated by the order executor 30.

Figure 2G:
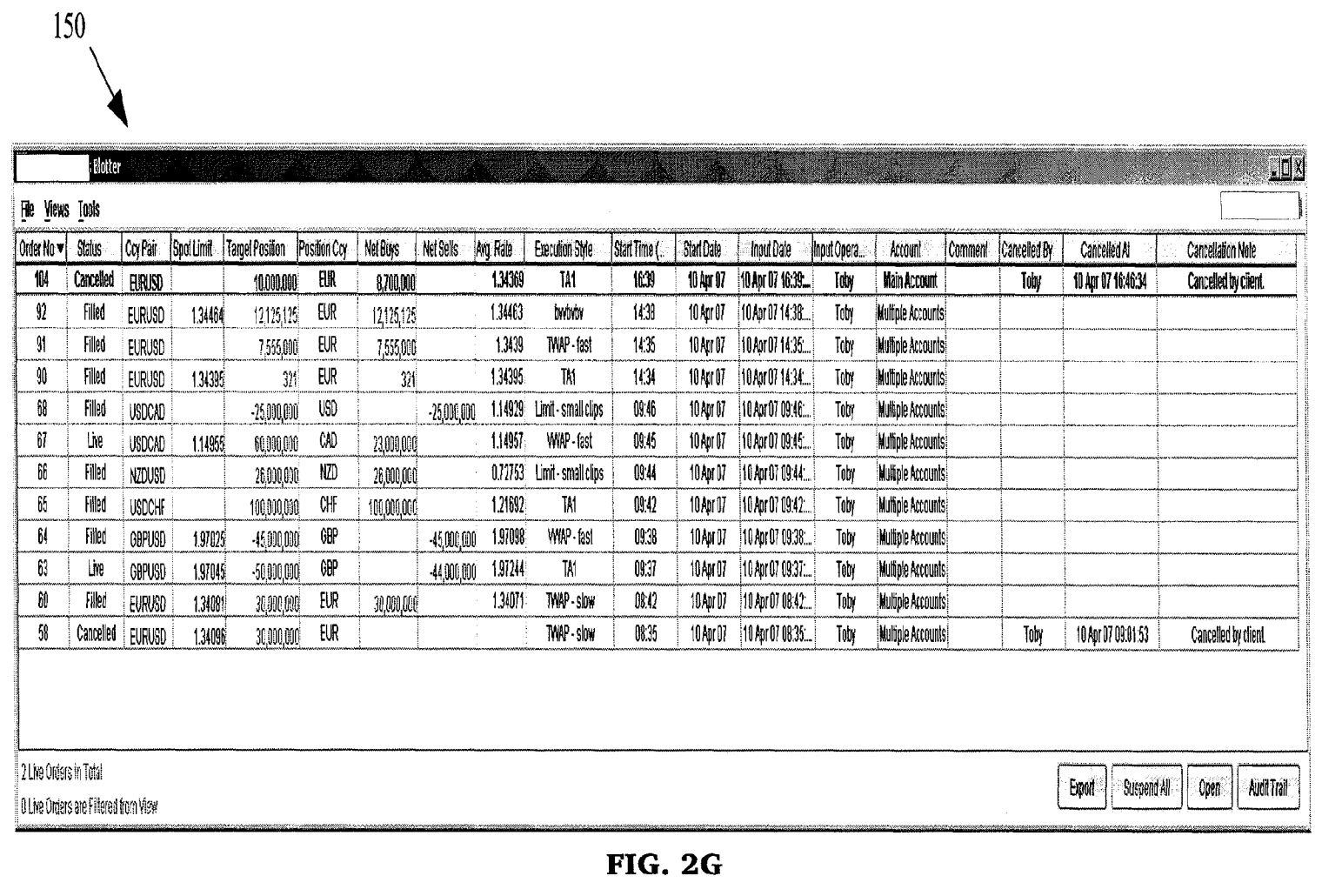

FIG. 2GF shows an order blotter screen 150 according to an exemplary embodiment of the present invention. The order blotter screen 150 preferably lists all active orders and all other orders actioned (i.e., filled, suspended, activated). As well as showing order details as input the blotter may also display details of the current fills to date. Once opened the blotter may be automatically populated with the appropriate orders.

In an exemplary embodiment of the present invention, the system 1 maintains the anonymity of the client placing the order until at least the order is executed. While there may be supervisory controls to correct errors made when placing an electronic order, as a safety feature a notification such as a flag may be activated when someone other than the client accesses the information associated with the order being placed.

In an embodiment of the invention, the system 1 may also include a security manager 40, otherwise known as a "pit boss". The security manager 40 protects the system 1 against potentially undesirable transactions or errors in placing orders. For example, the security manager 40 may check to determine if any clients are exhibiting a suspicious trading pattern, in which case the client may be directed to a live broker to execute the strategies, if appropriate. A suspicious trading pattern may be, for example, a particularly large volume of sales or buys from a single client or multiple clients from the same account. Further, the security manager 40 may suspend further trading by a client if it appears that there is a particularly large spread earned on ordered or executed transactions.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method comprising the steps of:
   receiving order data at one or more processors, the order data related to one or more order parameters of one or more foreign exchange currency trades;
   generating using the one or more processors configuration data, the configuration data related to configuration of each of the one or more trades; and
   automatically executing using the one or more processors each of the one or more trades based on the order data and the configuration data in two or more clips.

2. The method of claim 1, wherein each of the one or more parameters is selected from the group of parameters consisting of: currency for target position, counter currency, value date, quote size, spot limit, target position, and execution style.

3. The method of claim 2, wherein at least one of the one or more parameters is execution style, and the execution style is selected from the group of execution styles consisting of: limit, volume weighed average price, and time weighted average price.

4. The method of claim 3, wherein the execution style is further defined by at least one execution style information element selected from the group of execution style information elements consisting of: user-input name for the execution style, spread factor, time interval between clips, and clip size.

5. The method of claim 1, wherein the one or more parameters are selected from a list of one or more pre-defined parameters.

6. The method of claim 4, wherein the at least one execution style information element is clip size, and the clip size is fixed.

7. The method of claim 4, wherein the at least one execution style information element is clip size, and the clip size is varying.

8. The method of claim 4, wherein at least one execution style information element is clip interval, and the clip interval is fixed.

9. The method of claim 4, wherein the at least one execution style information element is clip interval, and the clip interval is varying.

10. The method of claim 1, further comprising keeping the one or more orders anonymous until the one or more trades are executed.

11. The method of claim 1, further comprising providing a visual indicator of spread size.

12. The method of claim 1, further comprising providing a security feature that prevents trade execution within an illiquid foreign exchange market.

13. The method of claim 12, wherein the step of providing a security feature comprises generating an alert when a plurality of orders for an identical foreign exchange trade is received.

14. A system comprising:
one or more processors; and
a computer readable medium having instructions executable by the one or more processors for performing a method comprising the steps of:
receiving order data at the one or more processors, the order data related to one or more order parameters of one or more foreign exchange currency trades;
generating using the one or more processors configuration data, the configuration data related to configuration of each of the one or more trades; and
automatically executing using the one or more processors each of the one or more trades based on the order data and the configuration data in two or more clips.

15. The system of claim 14, wherein each of the one or more parameters is selected from the group of parameters consisting of: currency for target position, counter currency, value date, quote size, spot limit, target position, and execution style.

16. The system of claim 15, wherein at least one of the one or more parameters is execution style, and the execution style is selected from the group of execution styles consisting of: limit, volume weighed average price, and time weighted average price.

17. The system of claim 16, wherein the execution style is further defined by at least one execution style information element selected from the group of execution style information elements consisting of: user-input name for the execution style, spread factor, time interval between clips, and clip size.

18. The system of claim 14, wherein the one or more parameters are selected from a list of one or more pre-defined parameters.

19. The system of claim 17, wherein the at least one execution style information element is clip size, and the clip size is fixed.

20. The system of claim 17, wherein the at least one execution style information element is clip size, and the clip size is varying.

21. The system of claim 17, wherein at least one execution style information element is clip interval, and the clip interval is fixed.

22. The system of claim 17, wherein the at least one execution style information element is clip interval, and the clip interval is varying.

23. The system of claim 14, further comprising keeping the one or more orders anonymous until the one or more trades are executed.

24. The system of claim 14, further comprising providing a visual indicator of spread size.

25. The system of claim 14, further comprising providing a security feature that prevents trade execution within an illiquid foreign exchange market.

26. The system of claim 25, wherein the step of providing a security feature comprises generating an alert when a plurality of orders for an identical foreign exchange trade is received.

27. A system comprising:
an order receiver that receives one or more order parameters of one or more foreign exchange currency trades;
an order configuration tool that configures each of the one or more trades; and
an order executor that generates instructions for automatically executing each of the configured one or more trades in two or more clips.

28. The system of claim 27, wherein each of the one or more parameters is selected from the group of parameters consisting of: currency for target position, counter currency, value date, quote size, spot limit, target position, and execution style.

29. The system of claim 28, wherein at least one of the one or more parameters is execution style, and the execution style is selected from the group of execution styles consisting of: limit, volume weighed average price, and time weighted average price.

30. The system of claim 29, wherein the execution style is further defined by at least one execution style information element selected from the group of execution style information elements consisting of: user-input name for the execution style, spread factor, time interval between clips, and clip size.

31. The system of claim 27, wherein the one or more parameters are selected from a list of one or more pre-defined parameters.

32. The system of claim 30, wherein the at least one execution style information element is clip size, and the clip size is fixed.

33. The system of claim 30, wherein the at least one execution style information element is clip size, and the clip size is varying.

34. The system of claim 30, wherein at least one execution style information element is clip interval, and the clip interval is fixed.

35. The system of claim 30, wherein the at least one execution style information element is clip interval, and the clip interval is varying.

36. The system of claim 27, further comprising a graphical user interface comprising a visual indicator of spread size.

37. The system of claim 27, further comprising a security feature that prevents trade execution within an illiquid foreign exchange market.

* * * * *